April 4, 1967 H. G. HENRICKSON ET AL 3,312,097
APPARATUS FOR FORMING CUP-SHAPED MEMBERS
Filed Jan. 23, 1964 10 Sheets-Sheet 2

FIG_8  FIG_9

FIG_2

INVENTORS
HENRY G. HENDRICKSON
BY CORNELIS LANGEWIS
James E. Toomey
ATTORNEY

FIG_5

FIG_7

INVENTORS
HENRY G. HENDRICKSON
BY CORNELIS LANGEWIS
ATTORNEY

FIG_6

United States Patent Office 3,312,097
Patented Apr. 4, 1967

3,312,097
APPARATUS FOR FORMING CUP-SHAPED
MEMBERS
Henry G. Henrickson, Oakland, and Cornelis Langewis, Walnut Creek, Calif., assignors to Kaiser Aluminum & Chemical Corporation, Oakland, Calif., a corporation of Delaware
Filed Jan. 23, 1964, Ser. No. 339,813
13 Claims. (Cl. 72—347)

The present invention relates to machines for forming cup-shaped metal containers, and especially elongated cup-shaped metal containers, such as the metal cans used in the food preservation industry.

It is a primary purpose of this invention to provide an improved machine for forming cup-shaped metal containers of the type referred to, from starting blanks which may have the form of shallow sheet metal cups or flat sheet metal disks.

This and other objects of the present invention will be apparent from the following description of the accompanying drawings which illustrate a preferred embodiment thereof and wherein.

The machine of the invention comprises a punch or ram P and a mechanism M for reciprocating said punch to drive during its forward stroke a cup-shaped blank B (FIG. 2) through a sequence of dies D. The machine of the invention also comprises a blank-holding device H for holding the cup-shaped blanks in their proper position in front of the advancing punch from the moment directly prior to engagement by said punch at the beginning of its forward stroke until they are drawn through the assembly of dies D.

Figure 2:
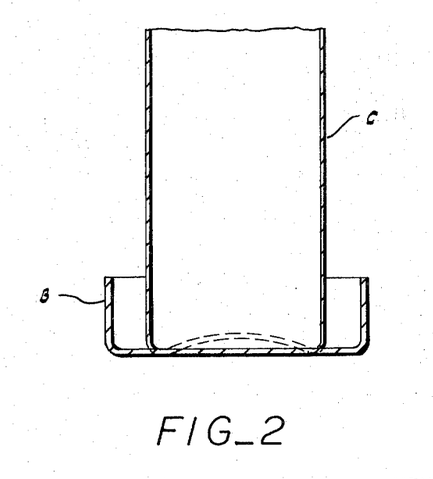
FIG. 2 is a cross section of a blank such as may be delivered to the machine of the invention, and superimposed thereon a cross section of the elongated container formed by the machine.

The mechanism for reciprocating the ram comprises a barrel or housing 10 within which is operated a piston rod structure 12 whose forward end carries the punch. Although this housing 10 is shown in the drawings as being disposed in a horizontal plane, it can also be advantageously disposed in other planes, such as a vertical plane. Several machines of the instant invention can also be arranged in groups or batteries whereby they can all be driven from a common power source. The barrel 10 can be provided with a first portion 14 of a relatively small internal diameter, a second portion 16 of a somewhat larger internal diameter which is suitably joined to said first portion and a radially expanded third portion 18 which constitutes the blank-receiving station and which has a lateral aperture through which a feeding apparatus F delivers the cup-shaped blanks in timed relation with the advance of the punch in to a position wherein they may be properly acted upon by the punch. The barrel 10 also comprises a terminal portion 21 which contains a tubular housing 22 for the reception of the dies D through which the punch draws the blanks B to form them into containers C of predetermined length, diameter and wall thickness (FIG. 2).

For reciprocating the piston rod structure 12 and hence the punch at high speeds, said structure carries within the first portion 14 of the barrel a piston 24. The open end of said first barrel portion communicates directly with a closed reservoir 26 that is filled with liquid. The reservoir 26 is located at the upper end of a vertically disposed cylindrical enclosure 28 preferably of a substantially larger diameter than the diameter of the adjacent end of the barrel. Within the cylindrical enclosure a piston 30 is slidably received. During operation of the machine, the piston 30 is continually reciprocated between predetermined levels by a circular cam disk 34 that is eccentrically mounted upon a horizontally disposed shaft 36. Shaft 36 is supported below and transversely to the axis of the barrel and is driven from a suitable motor (not shown) through a reduction transmission. The edge of the eccentric 34 engages a roller 38 that is rotatably mounted between a pair of piston skirts 40 for the piston 30. Hence, whenever the motor is set into motion and turns the shaft 36, the rotating eccentric 34 raises and releases the piston in rapid succession. When the eccentric raises the piston 30, it forces the pool of hydraulic liquid in closed reservoir 26 against the piston 24. This is effective to push the piston rod structure 12 forward and project the punch on its outer end from barrel portion 16 to an extent determined by the size and eccentricity of the disk 34, so that it may force a blank delivered in front of the punch through the dies D and in this manner form it into an elongated container C (FIG. 2).

Figure 4A:
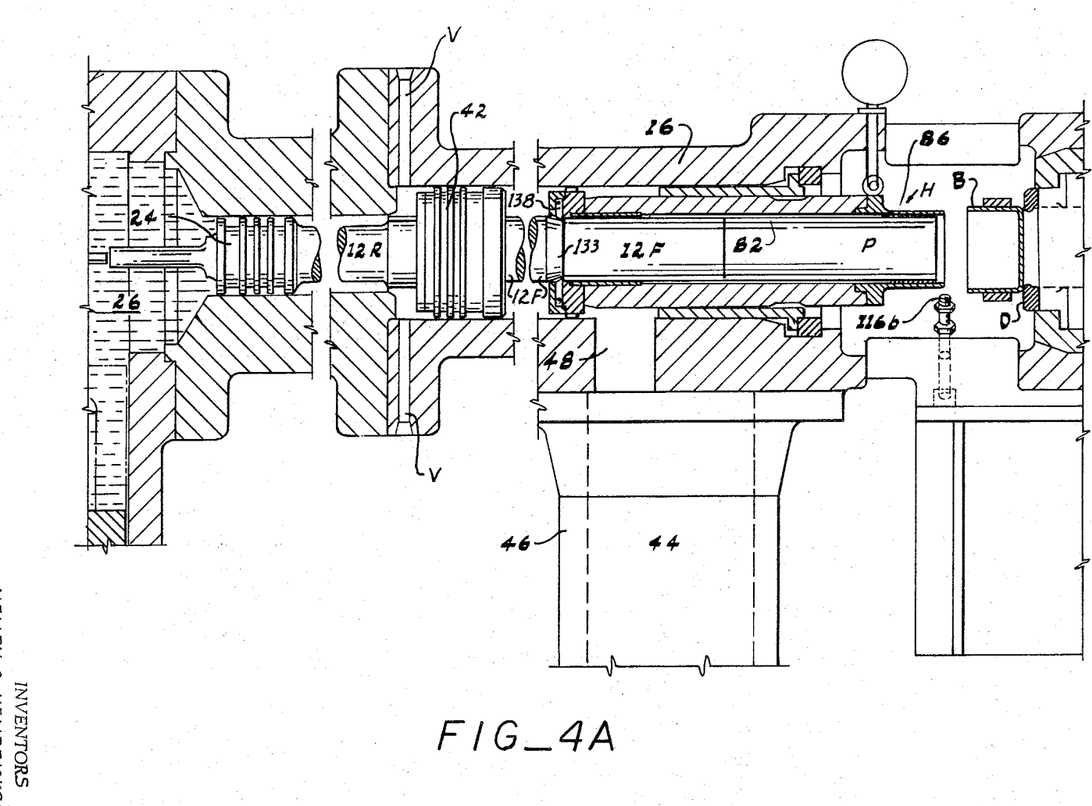
FIGS. 4A, 4B and 4C are fragmentary sections similar to FIG. 3C illustrating different operational positions of the machine.

To return the punch with utmost speed to its initial position upon completion of the can-forming forward stroke thereof, i.e., as soon as the rotating eccentric permits the actuator piston 30 to drop and said piston 30 releases its pressure upon the liquid in reservoir 26, the piston rod structure 12 carries within the second portion 16 of the barrel a second piston 42. Piston 42 is at all times yieldably urged in a direction opposite to the direction in which the positive hydraulic pressure is applied to piston 24 by a body of compressed air that is maintained in the hollow interior 44 of a column 46 which communicates with the interior of the second portion 16 of barrel 10 through an opening 48 at a point in front of said second piston 42. In the embodiment of the invention illustrated in the accompanying drawings, the column 46 has the added function of supporting the front end of the barrel. The interior of column 46 is supplied with compressed air from a suitable source (not shown) by means of a conduit 50. In order to maintain the pressure of air in said column and in the barrel portion 16 at a uniform level, the conduit 50 contains a pressure-regulating valve represented by the circle 52. During the upward stroke of the actuator piston 30, the positive hydraulic pressure applied to the piston 24 overcomes the opposing pressure of the air cushion applied to piston 42, but as soon as the eccentric 34 permits the actuator piston 30 to recede from its position of maximum amplitude, the compressed air in column 44 and barrel portion 16 becomes immediately effective to return the piston rod structure 12 and hence the punch to their initial positions (FIG. 4A).

Since the barrel portion 14 is of smaller diameter than the barrel portion 16, the volume of the space between pistons 24 and 42 is reduced in size during the return movement of the piston rod structure 12, and to prevent air contained in said space from opposing the described return movement of the piston rod structure, air vents V are provided at the end of barrel portion 16 adjacent barrel portion 14.

An arrangement for actuating a container-forming punch or ram of the type briefly outlined above is described in co-pending patent application Ser. No. 276,632, filed on Apr. 27, 1963, now Patent No. 3,137,245, Henry J. Henrickson et al., inventors, and for details in the construction and operation of such arrangements reference is made to said patent application Ser. No. 276,632.

The diameter of barrel portion 14 and the diameter of piston 24 are preferably small in order that the upward stroke of the actuator piston 30 may effect a rapid forward stroke of piston 24 and piston rod structure 12. On the other hand, the piston 42 and the second barrel section 16 are relatively large, and preferably significantly larger than the diameters of piston 24 and barrel section 14 to increase the effect of the compressed air upon said piston 24 in bringing about rapid return movement of the piston rod structure 12.

When a multi-part elongated barrel or cylinder structure of the type described is supported particularly in a horizontal position, there is the possibility that its center portion may droop slightly so that the axes of its consecutive portions do no longer form a continuous rectilinear line, but are in fact slightly inclined relative to each other; and the use of consecutive barrel portions of differently sized bores is another source of axial misalignments between the bores of the adjacent barrel portions. Any such disconformities between portions of an elongated barrel structure are liable to bend the piston rod operating therein and to deflect the course of the punch at its front end from coaxiality with the assembly of dies in the terminal section 21 of the barrel structure, which has disastrous consequences when the machine is operated at high speeds.

Basically, the assembly of dies is a sequence of axially aligned, relatively spaced metal rings of progressively smaller internal diameters (FIGS. 4B and 4C), with the internal diameter of the first ring slightly smaller than the external diameter of the cup-shaped blanks and the internal diameter of the last and smallest ring slightly larger than the external diameter of the punch so that the punch may push the elongated cup fully through said last ring to give it its final form. Even a very slight departure in the forward thrust of the punch from coaxiality with the axis of the die assembly D is liable to cause malformation of the containers produced by the described machine.

In accordance with the invention, therefore, the piston rod structure 12 operating in barrel 10 is advantageously split into a rear and a front section 12R and 12F, respectively, corresponding to the barrel positions 14 and 16 in which the pistons 24 and 42 operate, and said sections are flexibly coupled in such a manner that the driving section 12R can impart to the driven section 12F only a thrust parallel to the center axis of its barrel portion 16 irrespective of departures of said driving section 12R from coaxiality or even parallelism, with the center axis of said barrel portion 16. Having reference to FIG. 3A, the inner end face 54 of the driving piston rod section 12R is recessed as shown at 56 to receive the hub 58 of a buffer head 60 which may be bolted to the end of piston rod section 12R by a centrally located screw bolt 62. The outer surface 64 of the buffer head is of a slightly convex conformation and abuts against the flat end surface 66 of the driven piston rod section 12F. To hold the buffer head and the adjacent end of the driven piston rod section in operative relation with each other, the piston 42 is divided into two annular parts 42R and 42F. Part 42R engages the space between the buffer head 60 and an annular shoulder 68 provided on the driving rod section 12R near its inner end and is firmly secured to said rod section. Part 42F has the form of a collar which fits tightly over the peripheral end edge of the buffer head 60 but extends loosely over two axially spaced annular ridges or rings 70 and 72 provided on the adjacent end portion of the driven piston rod section 12F; and beyond said second ring 72 the collar 42F forms an inwardly turned retaining lip 76 which loosely surrounds the peripheral surface of the driven piston rod section 12F. Collar 42F is securely bolted to piston part 42R by bolts 78 at points radially beyond the peripheral edge of the buffer head 60. Due to the manner in which the piston rod sections are coupled with each other by the composite piston structure 42, their adjacent ends may tilt or shift radially relative to each other, without the possibility that one may impart any irregularity in its position to, or place a deflecting strain upon, the other. Thus, the driven piston rod section may be maintained in coaxiality with the die assembly in spite of any irregularities that may exist, or develop, in the position of the driving piston rod section and which would merely change the place of effective contact between the convex surface of the buffer head 60 and the adjacent end surface of the driven piston rod section 12F; in other words, the driving rod section may impart a forward thrust to the driven piston rod section without the possibility of placing any deflecting strains upon the driven piston rod section or the punch supported upon its front end.

Figure 3A:
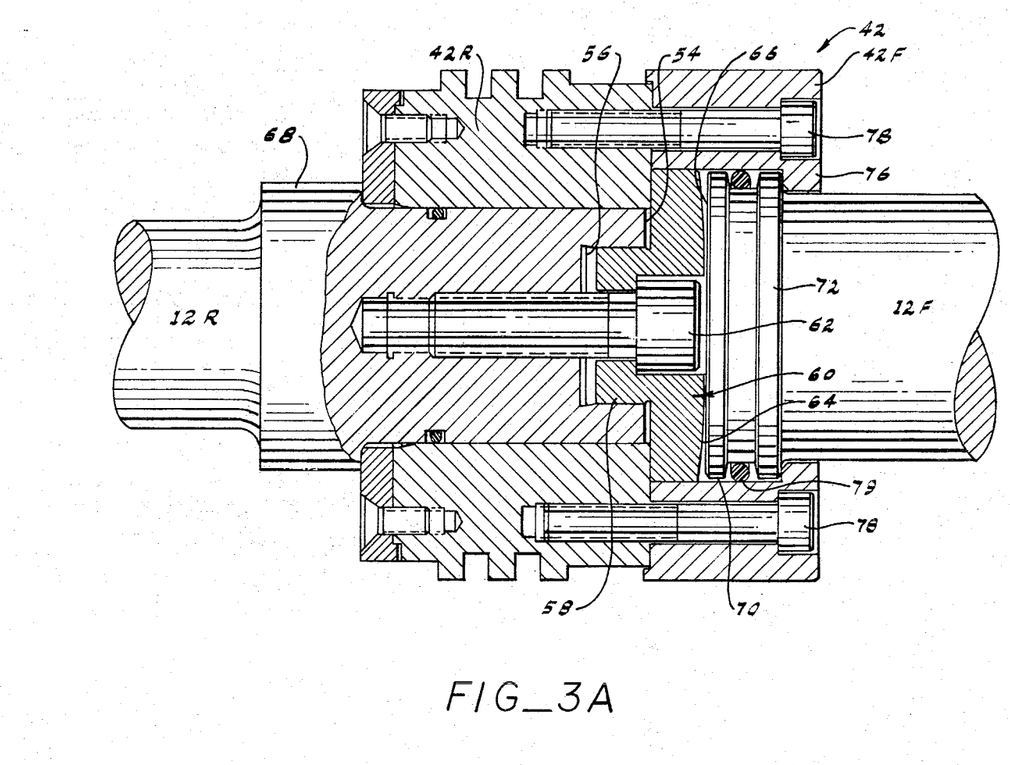
FIGS. 3A, 3B and 3C are fragmentary vertical sections through longitudinally consecutive areas of the machine.

An O-ring 79 is arranged between the annular ridges 70 and 72 upon the end portion of the driven piston rod section 12F to provide a flexible support for the piston rod 12F.

Figure 4B:
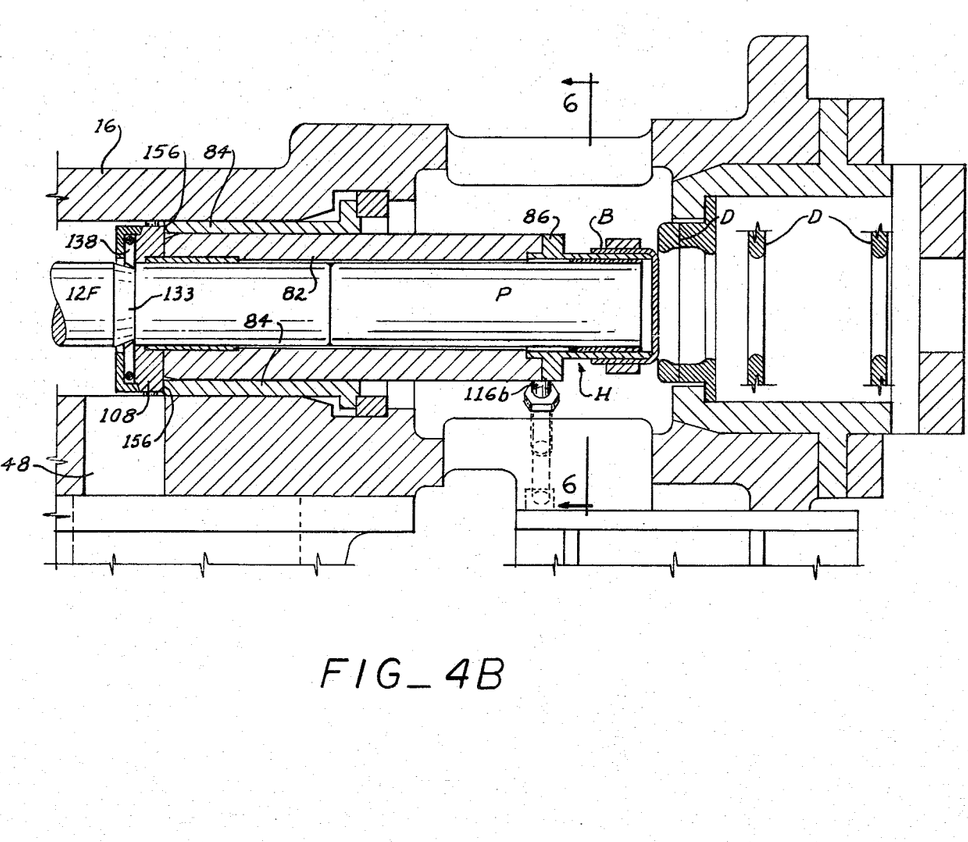

As pointed out hereinbefore, a cup-holding device H is provided at the end of barrel portion 16 for maintaining the cup-shaped blanks in their proper position from the instant when they are engaged by the advancing punch at the beginning of its forward stroke until they are drawn through the dies. Said cup-holding device has the form of a sleeve structure that is received within the end of said barrel portion 16 in the space between said barrel portion and the punch for initial sliding movement in unison with, but propelled independently from, the advancing punch from an initial position wherein it leaves sufficient space between its front edge and the first of the dies D for a blank to be delivered thereinto (FIG. 4A) to a position wherein it holds the bottom of the blank against said first die (FIG. 4B).

Figure 3B:
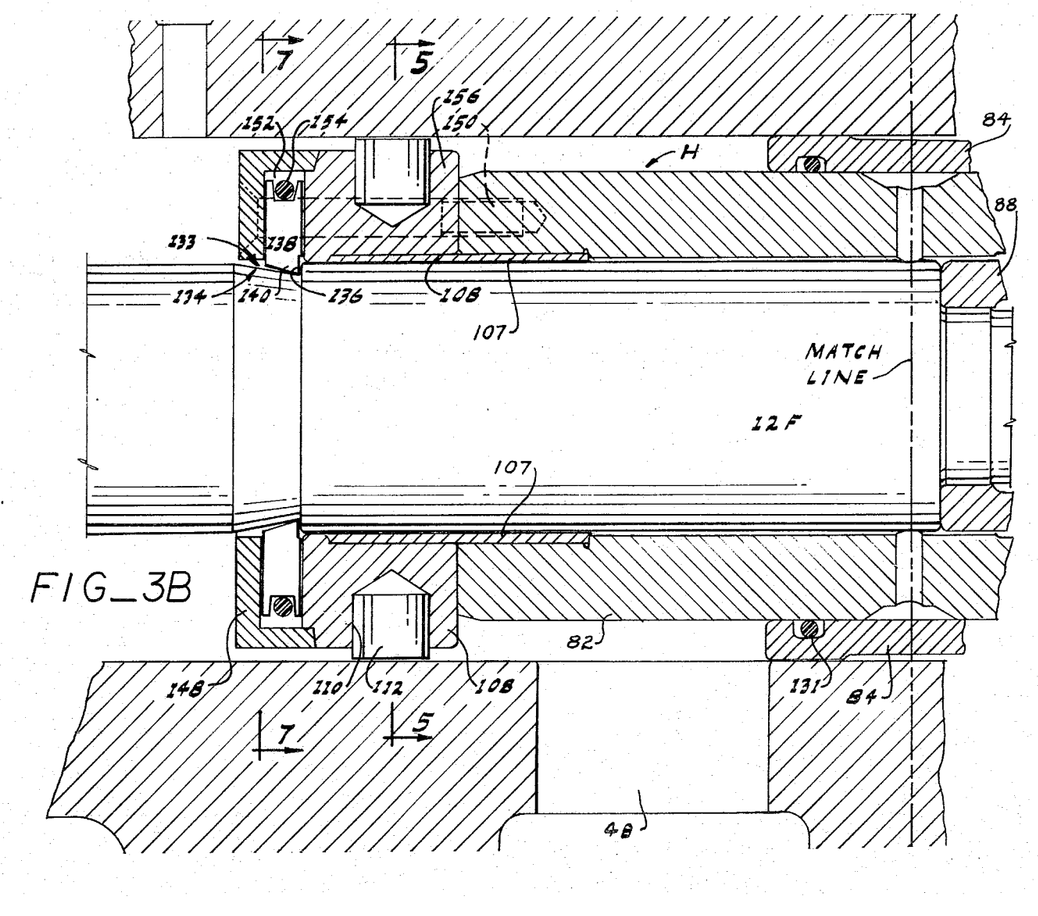
Figure 3C:
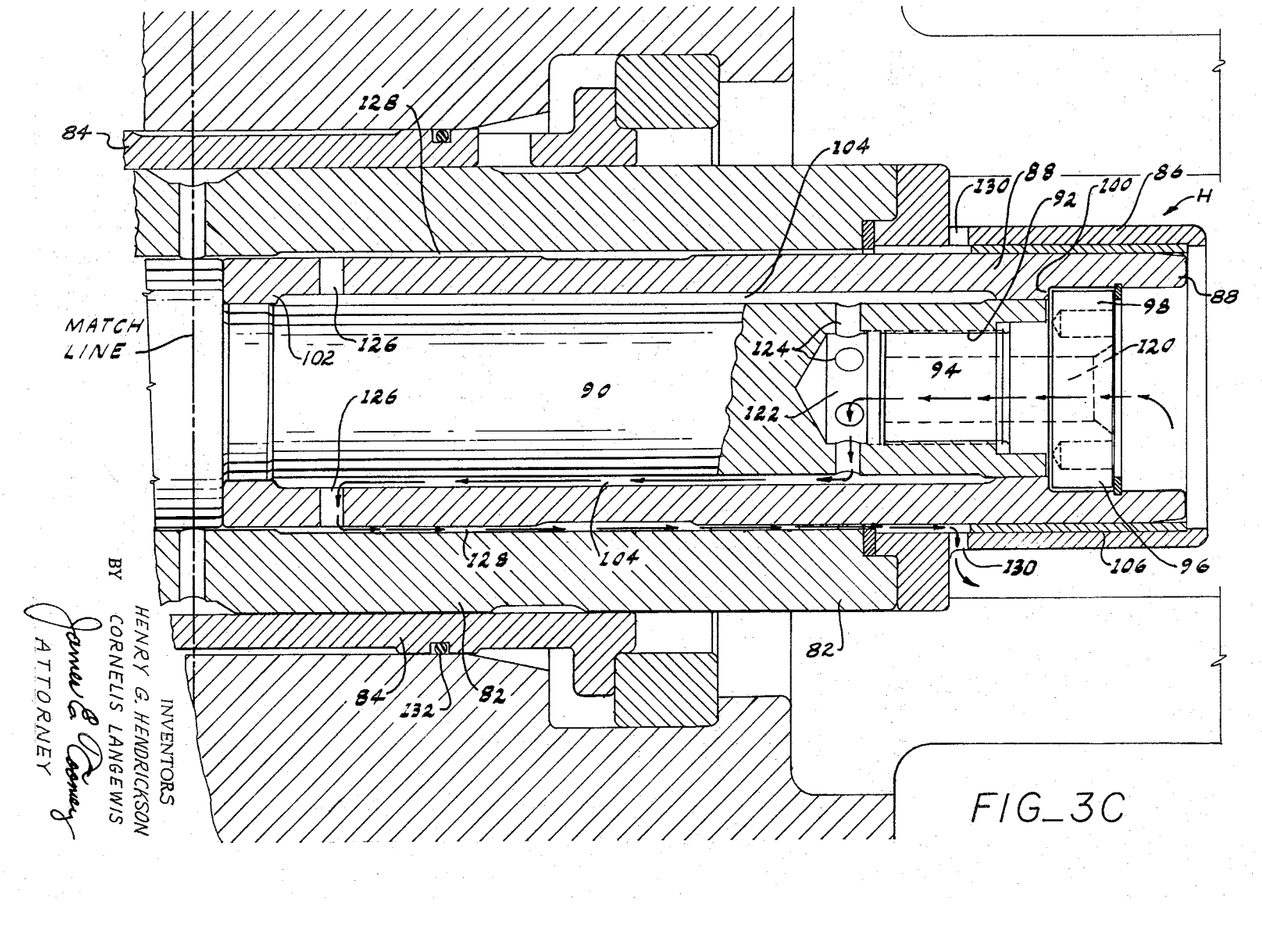

Having reference to FIGS. 3B and 3C, the cup-holding device H comprises a body portion in the form of a thick-walled sleeve 82 of an internal diameter that is only slightly larger than the external diameter of the punch P. Said sleeve 82 is slidably received within a bearing 84 that bears against and is suitably anchored in the inner surface of the barrel portion 16 adjacent the outer end thereof, i.e., the end adjacent the blank-receiving portion 18 of barrel structure 10. At its forward end said body portion carries firmly secured thereto a shell 86 that projects into the blank-receiving portion 18 of the barrel. This shell constitutes the cup holder proper and its front end has a reduced external diameter of such size that it slides snugly into the interior of a cup-shaped blank placed in its proper position before the punch prior to commencement of its forward stroke. The punch itself is formed by a sleeve 88 of hardened steel and of an external diameter substantially equal to the internal diameter which the elongated container is intended to have (FIG. 3C). Said sleeve is engaged over, and secured to, a cylindrical tennon 90 formed at the front end of section 12F of the piston rod structure. Said section 12F is preferably of a diameter equal to the external diameter of the punch sleeve 88. To secure the punch sleeve coaxially to the tennon 90, the free end of said tennon has an internally threaded center bore 92 that is engaged by the externally threaded stem 94 of a bolt 96. The head 98 of said bolt bears against an annular shoulder 100 that is formed on the inside of the punch sleeve 88 near the open end thereof. The shoulder 100 faces the cylindrical outer surface of the tennon 90 and in conjunction with another inwardly directed shoulder 102 formed at the opposite end of the punch sleeve 88 locates said sleeve in precise coaxial relation with the tennon 90 while establishing an annular interstice 104 between said tennon and the punch sleeve 88.

Figure 5:
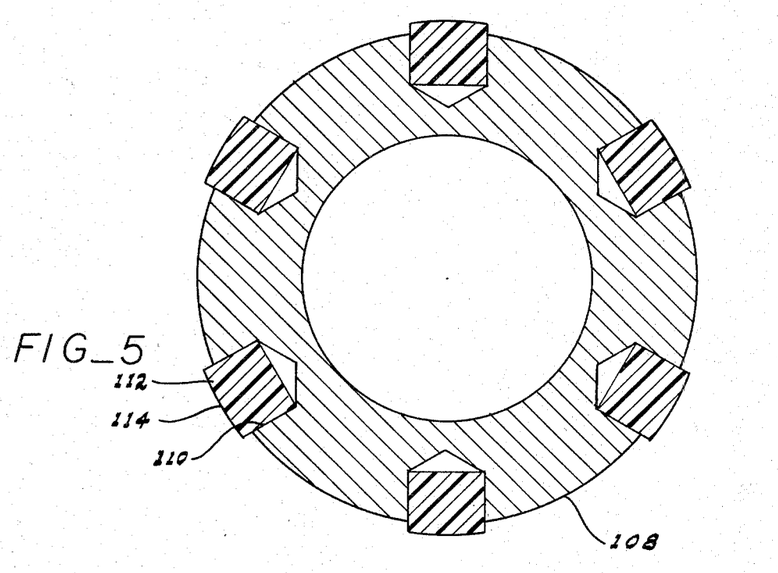
FIG. 5 is a section taken along line 5—5 of FIG. 3B and viewed in the direction of the arrows associated with said line.

To maintain the piston rod section 12F and the punch sleeve 88 in coaxial alignment with the longitudinal center axis of barrel portion 16 during their reciprocating movement within said barrel portion, a bearing 106 is provided on the inner surface of the cup-holding shell 86 and another bearing 107 is provided on the inner surface of the body portion 82 of said cup-holding device adjacent its inner end. To make certain that the cup-holding device in turn maintains coaxial alignment with the barrel portion 16 as it moves within said barrel portion, the body portion 84 of the cup-holding device carries bolted to its rear end a collar 108 of a smaller external diameter than the internal diameter of barrel portion 16 (FIG. 3B); and provided in the peripheral surface of said collar at angularly equi-spaced points thereof are radially directed recesses or bores 110 (FIG. 5). Within said recesses are received plugs or studs 112 of a smooth material such as the plastic known as "Teflon," which project beyond the peripheral surface of the collar 108. The outer end surfaces 114 of said plugs contact the inner cylindrical surface of the barrel portion 16 and are arcuate to conform to said surface. During movement of the cup-holding device within the barrel portion 16, they are in sliding contact with the inner surfaces of said barrel portion and maintain substantially precise axial alignment of the inner end of the cup-holding device with said barrel portion.

Figure 6:
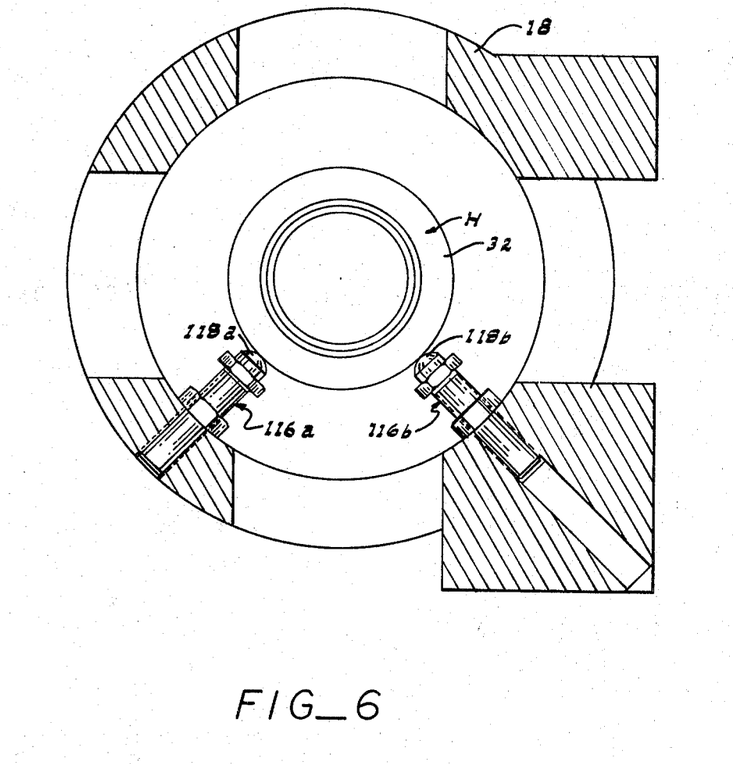
FIG. 6 is a section taken along line 6—6 of FIG. 4B and viewed in the direction of the arrows associated with said line.

As an added means for maintaining the cup-holding device and hence also piston rod section 12F and punch sleeve 88 in coaxial alignment with barrel portion 16 and the dies D, the expanded blank-receiving barrel portion 18 is arranged to present positive supports to the outer surface of the cup-holding device as it moves into the said barrel portion during operation of the machine. Having reference to FIGS. 4B and 6, the expanded barrel portion 18 carries at points displaced from its nadir line by angles of 45° inwardly projecting bolts 116a and 116b whose inner ends terminate in smooth hemispherical surfaces 118a and 118b, respectively. These hemispherical surfaces are engaged by, and smoothly support, the outer surface of the cup-holding device as it moves into said expanded barrel portion 18.

As the cup-holding device and the punch move into a cup-holding blank presented to them in said expanded barrel portion 18, entrapped air within the blank is rapidly compressed and may oppose advance of the cup-holding device in congruence with the punch, increase the load placed upon the motor which operates the machine, and/or deform the bottom of the elongated container produced by the machine. For this reason, the punch and the tennon 90 of the piston rod structure contain passages which permit air entrapped in the blank to escape as the blank is engaged by the cup-holder shell 86 and the punch. Having reference to FIG. 3C, the bolt 96 by which the punch sleeve 88 is secured to the end of the piston rod section 12F is of tubular construction as shown at 120, and the bore 92 of tennon 90 within which the bolt is received is of greater axial length than said bolt so that a space 122 is formed between the inner end of the bolt and the bottom of the bore when the bolt is in position. Radial channels 124 lead from said space 122 to the outer surface of the tennon 90 into the hereinbefore described annular interstice 104 between the tennon 90 and the punch sleeve 88, and said annular interstice in turn communicates through radially directed passages or channels 126 provided in the punch sleeve near its inner end, with a narrow annular space 128 that is established between the punch sleeve and the inner surface of the cup-holding device by a slight radial expansion of the hollow interior of the front half of said device and the presence of the hereinbefore described bearing 106. A plurality of apertures 130 provided in the shell 86 of the cup-holding device establish communication between said annular space 128 and the interior of the expanded barrel section 18 and hence the outside atmosphere. Therefore, as the punch P enters a blank during operation of the machine, the air in the blank may escape through the bore 120 of the bolt 96, the channels 124, the interstice 104, the channels 126, the space 128 and the apertures 130 in the cup-holding shell 86 into the outside atmosphere as indicated by arrows in FIG. 3C, and will not impede advance of the cup-holding device in congruence with the punch.

Figure 7:
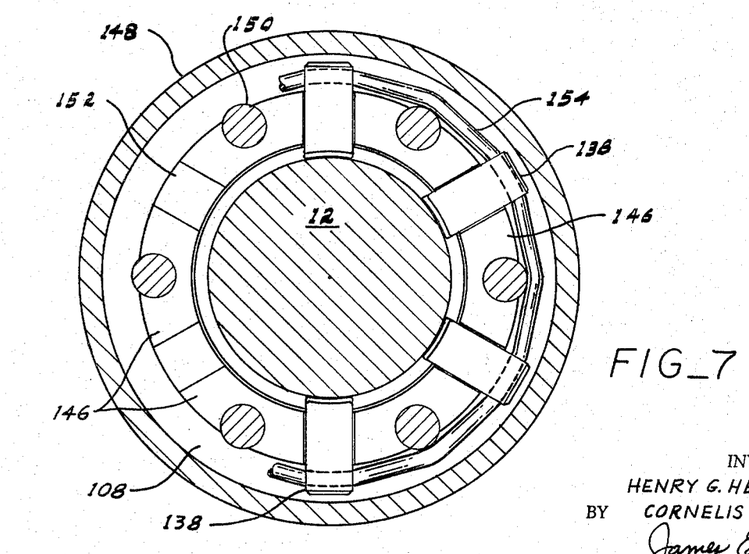
FIG. 7 is a section taken along line 7—7 of FIG. 3B and viewed in the direction of the arrows associated with said line.
Figure 8:
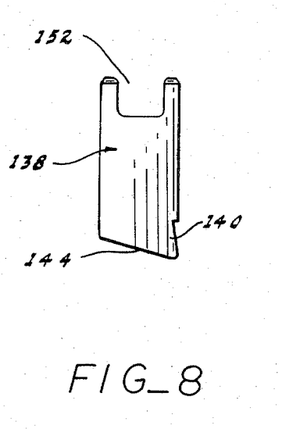
FIGS. 8 and 9 are the side and front elevations, respectively, of a component employed in the machine of the invention.
Figure 9:
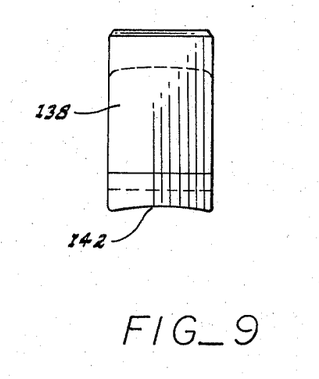

It remains to point out that O-rings are suitably arranged between the bearing sleeve 84 and the body portion 82 of the cup-holding mechanism and also between said bearing sleeve 84 and the barrel portion 16 as indicated at 131 and 132 in FIGS. 3B and 3C to prevent leakage of the compressed air within said barrel portion past the sleeve 84. The compressed air delivered into the barrel portion 16 from the column 46 through aperture 48 acts, therefore, at all times fully against the inner end of the cup-holding device and urges said device at all times in the direction of the dies, but in accordance with the invention means are provided that limit outward movement of the cup-holding device relative to the piston rod and the punch under the urgency of the compressed air to the position illustrated in FIGS. 4A and 4B wherein the front edge of the cup-holding sleeve 86 projects only a very limited distance beyond the front edge of the punch sleeve 88. For this purpose, the piston rod section 12F is provided with a circumferential groove 133 defined by a slanting floor 134 and a vertical end surface 136 (FIG. 3B). Said groove is engaged by the tips 140 of a plurality of circumferentially spaced fingers 138 (FIG. 7) which bears against the end surface 136 of the groove 133. Said tips form a concave edge 142 (FIG. 9) to conform with the curvature of shaft section 12F, and have a rearwardly slanting end surface 114 which is of slightly greater steepness than the slant of floor 134 (FIG. 8). The fingers 138 are maintained in their circumferentially spaced positions by shoulders 146 (FIG. 7) formed on the rear surface of the previously described collar 108 at the rear end of cup-holder sleeve 82. They are contained upon said collar by a centrally apertured cap 148 (FIG. 3B) that is secured to the cup-holding mechanism by screw bolts 150 which pass through the collar at points intermediately of the fingers 138 and extend into the rear portion of the body 82 of the cup-holding device. The outer ends of the fingers 138 are provided with circumferentially extending recesses 152 (FIG. 8) and the recesses of all the fingers comprised in the described arrangement are engaged by a ring of elastic material 154 (FIG. 7) to hold said fingers yieldably in the position illustrated in FIG. 3B wherein their tips are engaged behind the end surface 136 of groove 133 and make it impossible for the cup-holding mechanism to advance beyond the illustrated position relative to piston rod section 12F and punch sleeve 88, but leave the piston rod and the punch sleeve free to advance beyond the cup-holding mechanism.

Figure 1:
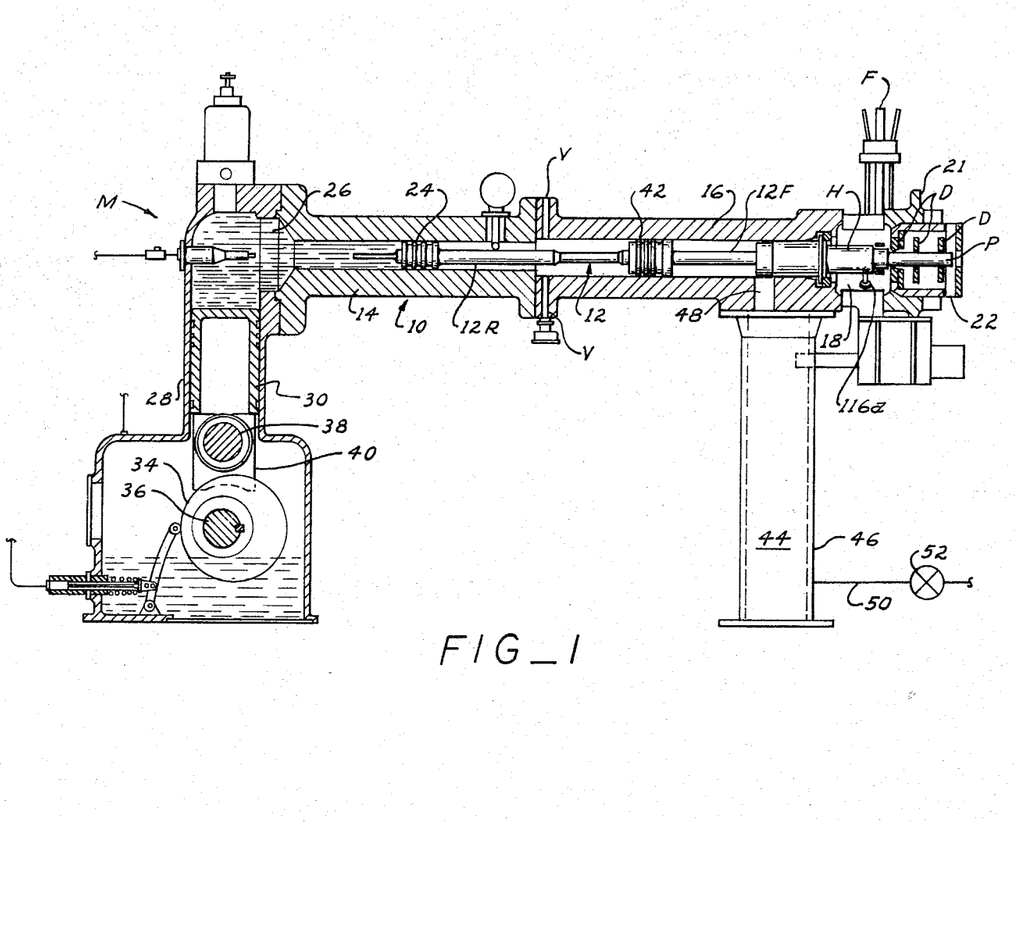
FIG. 1 is a central vertical section through a preferred embodiment of a container-forming machine embodying the invention.

In the defined position, both the cup-holding sleeve 86 and the punch 88 leave sufficient space for a blank to be delivered into the blank-receiving portion 18 of the barrel structure directly in front of the first of the dies D; and when a blank has been placed into its proper position before the punch, with its concave side facing the punch, and the punch begins its advanced propelled by the upward stroke of the actuator piston 30 (FIG. 1), the compressed air in the barrel portion 12F acts upon the rear end of the cup-holding device and forces said device to advance in unison with the punch and enter and engage the interior of the cup-shaped blank (FIG. 4B) so that the blank retains its properly centered position as the advancing punch engages the bottom of the cup and begins to force it through the dies.

Figure 4C:
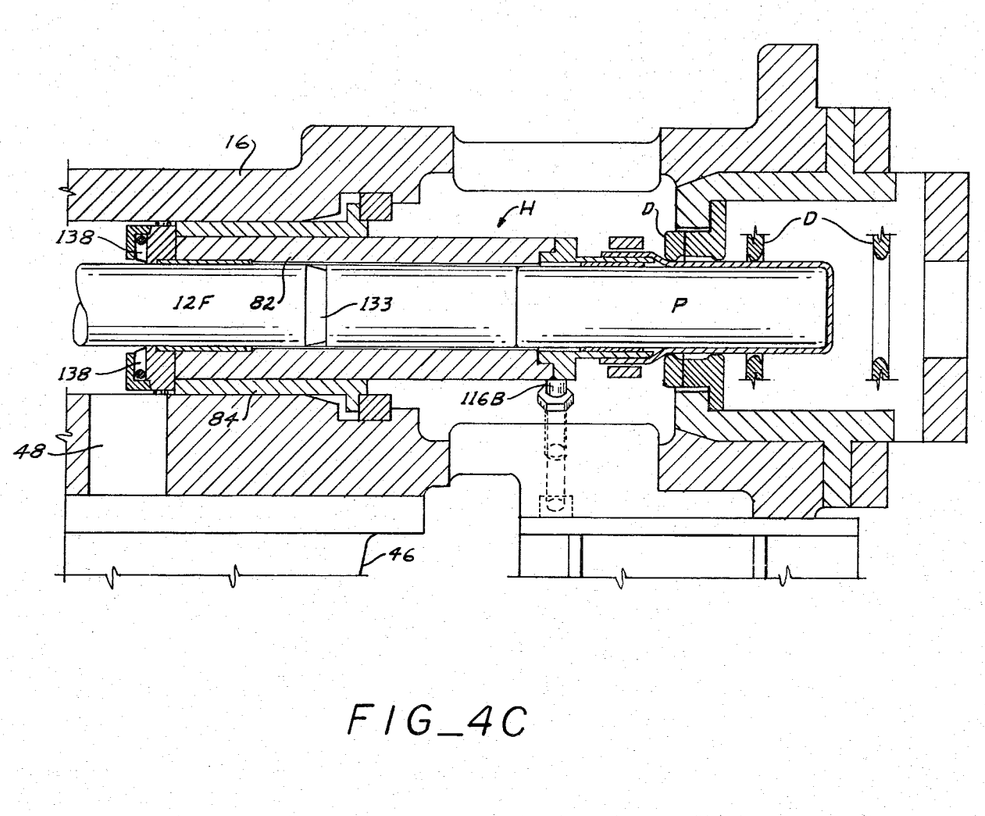

Forward movement of the cup-holding device in unison with the punch is limited, however, by the shoulder 156 formed by the collar 108 which projects radially beyond the body of the cup-holding device as previously pointed out (FIG. 3B). When this shoulder comes against the inner edge of the sleeve 84 that forms the main bearing for the cup-holding device, the front edge of the cup-holding shell 86 is spaced from the first of the dies by a distance substantially equal to the thickness of the sheet material from which the cup-shaped blank is made (FIG. 4B). During the following drawing operation effected by the continuing advance of the punch, the compressed air behind the inner end of the cup-holding mechanism holds the leading edge of the cup-holding shell 86 with a predetermined pressure in its proper cup-engaging position (FIG. 4C). This pressure depends, of course, upon the amount of air pressure set up in accumulator column 44 and barrel portion 16 and is so chosen as to prevent crinkling of the wall of the cup as it is drawn through the dies. The piston rod and the punch sleeve mounted on its outer end may, however, advance unobstructedly under the force of the hydraulic pressure applied to piston 24 by the action of the actuator piston 30 because the slanting floor 134 of groove 133 cams the tips of the retaining fingers 138 out of said groove against the urgency of the resilient ring 154 so that they will not interfere with the proper can-drawing operation of the punch.

Upon completion of the forward stroke of punch P, the actuator piston 30 releases the liquid in reservoir 26 and the compressed air in accumulator column 44 and the barrel portion 16 effects return movement of the piston rod structure and the punch. At this phase, the effect of the compressed air upon the outer surface of the cap 148 at the rear of the cup-holding device maintains the cup-holding device momentarily in its forwardly projected position until the annular groove 133 in the returning piston rod section 12F slides underneath the fingers 138 within the cap 148 (FIG. 4B). At this moment, the elastic ring 154 forces the tips of said fingers 138 to drop into said groove and engage the end wall 136 thereof. From this moment on, the cup-holding mechanism is forced to participate in the return movement of the piston rod in spite of the effect of the compressed air upon its cap 148 because the area of the cup-holding device that is effectively exposed to the compressed air in barrel section 16 is smaller than the effective area presented to the compressed air by the piston 42. Thus, both the punch and the cup-holding device return in unison to their original position (FIG. 4A). Another cup-shaped blank may now be delivered into the space in front of the punch and another cycle in the operation of the machine may commence.

*Operation*

When the eccentric 34 presents its lowest point to the roller 38 on the stem of actuator piston 30, and said piston is, therefore, in its lowermost position, the piston rod structure 12 is fully retracted due to the action of the compressed air in barrel portion 16 upon the piston 42. In this position, the front end of the punch P projects to a limited extent into the radially expanded portion 18 of the barrel which constitutes the blank-receiving station of the machine (FIGS. 3C and 4A). The compressed air in barrel section 16 also acts upon the rear end of the cup-holding mechanism urging it forwardly out of barrel portion 16 into barrel portion 18, but said mechanism is held positively in a predetermined position longitudinally of the piston rod structure by engagement of its fingers 138 with the circumferential groove 133 in section 12F of the piston rod structure (FIG. 3B). In this position, its shell 86 projects only a very limited extent beyond the front edge of the punch sleeve. With the punch and the sleeve-holding mechanism in the defined position, a blank feeding apparatus, such as the blank feeding apparatus F described in the hereinbefore-mentioned U.S. patent application Ser. No. 276,632, may have placed a cup-shaped blank in front of the punch and the cup-holding shell with its open side facing said punch and said cup-holding shell. Upon clockwise rotation of shaft 36, the eccentric 34 begins to raise the actuator piston 30 and, in consequence thereof, the hydraulic liquid in reservoir 26 presses upon piston 24 and advances the piston rod section 12R causing the convex front surface 64 of the buffer head 60 on its inner end to contact and advance the piston rod section 12F in coaxiality with barrel portion 16 and hence with the die assembly D irrespective of any departure of piston rod section 12R or barrel portion 14 from precise coaxial alignment with piston rod section 12F and/or barrel portion 16.

As the piston rod section 12F moves forwardly, it permits the compressed air in barrel portion 16 to advance the cup-holding mechanism in unison therewith, and both the cup-supporting shell 86 of said mechanism and the punch on the front end of the piston rod section enter the open end of a properly positioned blank B in coaxiality therewith (FIG. 4B) because the cup-holding mechanism is held in coaxial alignment with the barrel section 16 by the bearing sleeve 84 and the coronet of spacer studs 112 at the inner end of the cup-holding mechanism, and the piston rod section 12F and the punch at its front end are held in coaxial alignment with the advancing cup-holding mechanism by the bearings 106 and 107; and as both the shell 86 of the cup-holder mechanism and the punch enter the cup-shaped blank in unison, the air entrapped in the blank may escape through the tubular interior of bolt 96, the radial passages 124, the annular interstice 104, the radial passages 126, the space 128 between the punch and the body of the cup-holding mechanism and the apertures 132 in the cup-holding shell 86 to the outside, and therefore will not impede the aligned advance of the cup-holding shell 86 into the interior of the blank.

As both the punch and the cup-holding shell 86 advance in unison into the barrel portion 18, the outer surface of the cup-holding device comes into sliding contact with, and is positively supported in coaxiality with barrel portion 18 and the die assembly D by the rounded heads 118a and 118b of the supporting members 116a and 116b, respectively (FIG. 6); and as the shell 86 of the cup-holding mechanism reaches the bottom of the cup and holds it against the first of the dies, further advance of the cup-holding device is positively arrested by engagement of its shoulder 156 with the inner end edge of the bearing sleeve 84 (FIG. 4B). From now onward, the cup-holding mechanism holds the bottom of the cup with a predetermined pressure against the first of the dies while the punch continues its advance under the force of the hydraulic fluid acting upon piston 24 (FIG. 4C) without hindrance from the arrested cup-holding mechanism because the fingers 138 which couple the cup-holding mechanism to the piston rod section 12F for initial synchronized forward movement therewith may readily slide out of engagement with the circumferential groove 133 along the slanting floor 134 thereof against the urgency of resilient ring 154 whenever the advance of the cup-holding mechanism is positively arrested.

As continued clockwise rotation of the eccentric 34 places progressively higher points of its edge underneath the cam follower roller 38 and forces the punch to advance through the consecutive dies of the die assembly and form the cup-shaped blank in this manner into an elongated container, the punch is dependably held in coaxial alignment with the die assembly due to the fact that during the drawing operation the cup-holding mechanism in which the punch P and the piston rod section 12F operate is positively supported in coaxial alignment with the barrel sections 16 and 18 (and hence with the die assembly) at three different points longitudinally thereof, namely, (1) at its inner end by the studs 112, (2) along its middle portion by the bearing sleeve 84 and (3) at its front end within the radially expanded blank-receiving barrel portion 18 by the supports 116a and 116b. Furthermore, due to the fact that the punch and its supporting piston rod section 12F are of equal external diameters, the bearing 106 in the shell portion 86 of the cup-holding mechanism which initially supports the punch itself serves to support the piston rod section 12F during the final phases in the forward stroke of the punch; and last but not least, the partition of the piston rod structure into a rear and a front section and the manner in which these sections are coupled for effective cooperation make it impossible for any deviations of the driving rod section 12R from coaxiality with the die assembly to be imparted to the punch. Hence, the machine of the invention may be operated at great speeds for extended periods of time to produce elongated containers without malformations such as occur when the punch departs from accurate coaxial alignment with the die assembly.

After the eccentric 34 has placed its highest point underneath the cam follower roller 38 and the punch has pushed a blank fully through the die assembly and formed it into an elongated container such as shown at C in FIG. 2, continued rotation of said eccentric places progressively lower points of its contour underneath the cam follower roller on the stem of the actuator piston 30. Said piston, therefore, releases progressively its pressure upon the liquid in reservoir 26 and allows the compressed cushion of air in barrel portion 16 to act upon the piston structure 42 and effect return movement of said piston rod structure and the punch P. Initially, the return movement of piston rod section 12F has no effect upon the cup-holding mechanism which remains in its advanced position due to the fact that the compressed cushion of air in barrel portion 16 acts upon its exposed inner end surfaces and therefore tends to drive it forwardly out of said barrel portion 16. However, when the circumferential groove 133 in the returning piston rod section 12F slides underneath the tips of the fingers 138 at the inner end of the cup-holding mechanism, the resilient ring 154 urges the tips of said fingers into engagement with the groove 133 (FIG. 4B). This brings the end face 136 of said groove against the tips of the fingers, and as a result thereof the cup-holding mechanism is coupled to the piston rod section 12F for movement in the direction opposite to the direction of its container-forming stroke; and since the area of piston structure 42 that is exposed to the cushion of compressed air in barrel portion 16 is larger than the area of the cup-holding mechanism that is exposed to said air cushion, the piston rod structure continues its return movement and forces the cup-holding mechanism to participate in its movement until both the piston rod structure and the cup-holding mechanism have resumed their initial positions (FIG. 4A). A cycle in the operation of the machine has now been completed and another one is about to commence.

An advantageous embodiment of the invention has been disclosed and described by way of example. It will be understood that various changes may be made therein without departing from the spirit and scope of the invention as defined in the appended claims.

What is claimed is:

1. For operation in elongated housings a piston rod structure comprising consecutive first and second piston rod sections, a buffer member at the end of said first piston rod section arranged to present a convex end surface to the adjacent end surface of said second piston rod section, and a piston firmly mounted upon said first piston rod section and having a collar element engaging said buffer member at the end of said first piston rod section as well as a portion of the second piston rod section and coupling said piston rod sections in such a manner as to hold said buffer member in operative relation with the adjacent end surface of said second piston rod section while leaving said piston rod sections free to tilt and shift relative to each other.

2. For operation in elongated, horizontally disposed housings, a piston rod structure comprising consecutive first and second piston rod sections, a first piston mounted upon said first piston rod section near the free end thereof for actuation by hydraulic means, a buffer member at the inner end of said first piston rod section arranged to present a convex end surface to the adjacent end surface of said second piston rod section, a ring upon said second piston rod section adjacent the inner end thereof, and a second piston firmly mounted upon said first piston rod section adjacent said buffer member and having a portion extending over said buffer member and loosely engaged behind the ring on said second piston rod section to hold said buffer member in operative relation with the adjacent end surface of said second piston rod section while leaving said piston rod sections free to tilt and shift relative to each other.

3. A machine for forming cup-shaped blanks into elongated containers comprising a barrel section, bearing means in said barrel section, a sleeve-shaped cup-holding device slidably received within said bearing means and having a front end adapted to slide into and hold a cup-shaped blank, a piston rod slidably received within said cup-holding device and supporting a punch; and means for maintaining said cup-holding device and said punch in coaxial relation with said barrel section including a plurality of circumferentially spaced studs of a smooth material mounted on said cup-holding device and arranged to project radially into sliding contact with the inner surface of said barrel section.

4. A machine for forming cup-shaped blanks into elongated containers comprising a barrel-section, bearing means in said barrel section, a sleeve-shaped cup-holding device slidably received with said bearing means and having a front end adapted to slide into and hold a cup-shaped blank, a piston rod slidably received within said cup-holding device and supporting a punch, and means for maintaining said cup-holding device and said punch in coaxial relation with said barrel section and for limiting forward movement of said cup-holding device within said barrel section including a collar at the rear end of said cup-holding device projecting radially beyond the outer surface thereof to form a shoulder for contact with the inner end edge of said bearing means, and held in said collar a plurality of circumferentially spaced studs of a smooth material arranged to project radially into sliding contact with the inner surface of said barrel section.

5. A machine for forming cup-shaped blanks into elongated containers comprising a barrel section, first bearing means in said barrel section, a sleeve-shaped cup-holding device slidably received within said bearing means and having a front end adapted to slide into and hold a cup-shaped blank, second bearing means arranged in said cup-holding sleeve near the front end and the rear end thereof, a piston rod slidably received within said second bearing means and having mounted upon its front end a sleeve-shaped punch of the same external diameter as said piston rod; and means for maintaining said cup-holding device and said piston rod and punch in coaxial relation with said barrel section including a plurality of circumferentially spaced studs of a smooth material mounted in said cup-holding device and arranged to project radially into sliding contact with the inner surface of said barrel section.

6. A machine for forming cup-shaped blanks into elongated containers comprising a barrel section, a first sleeve-shaped bearing in said barrel section, a sleeve-shaped cup-holding device slidably received within said bearing and having a front end adapted to slide into and hold a cup-shaped blank, second bearings arranged in said cup-holding device near the front end and the rear end thereof, a piston rod slidably received within said second bearings and having mounted upon its front end a sleeve-shaped punch of the same external diameter as said piston rod; and means for maintaining said cup-holding device in coaxial relation with said barrel section and for limiting forward movement of said cup-holding device within said barrel section including a collar at the rear end of said cup-holding device projecting radially beyond the outer surface of said cup-holding device to form a shoulder for contact with the inner end edge of said first bearing, and held in said collar a plurality of circumferentially spaced studs of a smooth material arranged to project radially into sliding contact with the inner surface of said barrel section.

7. In a container-forming machine of the type described, an arrangement comprising a sleeve-shaped cup holder, a piston rod made up of sections loosely coupled together and one of said sections being slidably received within said cup holder, and means for coupling said cup holder to said one section of said piston rod for rearward movement in unison with said piston rod from a predetermined position relative thereto while leaving the piston rod free to advance relative to said cup holder independently therefrom including a circumferential groove in the one piston rod section, a number of radially directed fingers, means on said cup holder for supporting said fingers for radial movement relative to said one piston rod section, and yieldable means for urging said fingers radially against the outer surface of said one piston rod section so that they may engage said groove at said predetermined relative position of said one piston rod section and said cup holder.

8. In a container-forming machine of the type described, an arrangement comprising a sleeve-shaped cup holder, a piston rod made up of sections loosely coupled together, one of said sections being slidably received within the cup holder, and means for coupling said cup holder to said one piston rod section for rearward movement in unison therewith from a predetermined position relative thereto while leaving the piston rod free to advance relative to said cup-holder sleeve independently therefrom including a circumferential groove in said one piston rod section, said groove having a slanting floor and a radially extending front wall, a plurality of circumferentially spaced radially directed fingers, means on said cup holder for supporting said fingers for radial movement relative to said one piston rod section, and yieldable means for urging said fingers radially against the outer surface of said one piston rod section so that they may engage said groove at said predetermined relative position of said one piston rod section and said cup holder.

9. A machine for forming elongated metal containers from cup-shaped blanks comprising a barrel having a radially expanded end portion for the reception of the blanks, a cup holder in the form of a sleeve slidable within said barrel, a punch slidably received within said cup holder, means for projecting said cup holder and said punch into said expanded barrel portion, and means for maintaining said cup holder and said punch in coaxial relation with said barrel as they are projected into said expanded barrel portion including a sleeve-shaped bearing coaxially interposed between said barrel and said cup holder, a plurality of circumferentially spaced studs of a smooth material supported in and projecting radially from said cup holder adjacent the inner end thereof and into contact with the inner surface of said barrel, and in said expanded barrel portion supports having rounded end surfaces for contact with the outer surface of said cup holder as said cup holder is projected into said expanded barrel portion.

10. A machine for forming elongated metal containers from cup-shaped blanks comprising a barrel having a radially expanded end portion for the reception of the blanks, a cup holder in the form of a sleeve slidable within said barrel, a punch slidably received within said cup holder, means for projecting said cup holder and said punch into said expanded barrel portion while maintaining them in coaxial relation with said barrel including a piston within said barrel for actuation by hydraulic means, piston rod sections interposed between said piston and said punch, means coupling said piston rod sections in a manner effective to transmit a forward thrust of said piston to said punch while permitting relative tilting and displacement of said piston rod sections; a plurality of circumferentially spaced studs of a smooth material supported in and projecting radially from said cup holder adjacent the inner end thereof and into sliding contact with the inner surface of said barrel and mounted in said expanded barrel portion inwardly directed supports having rounded end surfaces for supporting contact with the outer surface of said cup holder as said cup holder is projected into said expanded barrel portion.

11. A machine for forming elongated metal containers from cup-shaped blanks comprising a barrel, in front of said barrel a die arranged coaxially therewith, a sleeve-shaped cup-holding device slidably received within said barrel and having a front end adapted to slide into and hold a cup-shaped blank, a punch slidably received within said cup-holding device for projection through said die, yieldable means for projecting said cup-holding device from said barrel section and for returning said punch from its projected position, means for limiting forward movement of said cup-holding device relative to said barrel, means for projecting said punch from said barrel and through said die in coaxial relation with said die including within said barrel a piston for actuation by hydraulic means, piston rod sections interposed between said piston and said punch, means for coupling said piston rod sections in a manner effective to transmit a forward thrust of said piston to said punch while permitting said piston rod sections to tilt and shift relative to each other, and in the space between the front end of said barrel and said die supports presenting rounded top surfaces for contact with the outer surface of said cup-holding device as said device is projected from said barrel, and means for coupling said cup-holding device to one of said piston rod sections in a manner compelling said cup-holding device to participate in the rearward movement of said piston rod sections with said punch from a predetermined position thereof relative to said piston rod sections.

12. A machine for forming elongated metal containers from cup-shaped blanks comprising a barrel, in front of said barrel a die arranged coaxially therewith, a sleeve-shaped bearing in said barrel, a sleeve-shaped cup-holding device slidably received within said bearing and having a front end adapted to slide into and hold a cup-shaped blank, a punch slidably received within said cup-holding device for projection through said die, yieldable means for projecting said cup-holding device from said barrel section and for returning said punch from its projected position, means for limiting forward movement of said cup-holding device relative to said barrel including a collar at the rear end of said cup-holding device projecting radially beyond the outer surface of said cup-holding device to form a shoulder for engagement with the inner end edge of said bearing, means for projecting said punch from said barrel and through said die in coaxial relation with said die including within said barrel a piston for actuation by hydraulic means, piston rod sections interposed between said piston and said punch, means for coupling said piston rod sections in a manner effective to transmit a forward thrust of said piston to said punch while permitting said piston rod sections to tilt and shift relative to each other, a plurality of circumferentially spaced studs of a smooth material mounted in the collar of said cup-holding device and arranged to project radially into sliding contact with the inner surface of said barrel, and in the space between the front end of said barrel and said die supports presenting rounded top surfaces for contact with the outer surface of said cup-holding device as said device is projected from said barrel, and means for coupling said cup-holding device to one of said piston rod sections in a manner compelling said cup-holding device to participate in the rearward movement of said piston rod sections with said punch from a predetermined position thereof relative to said piston sections while leaving said piston rod sections and said punch free to advance relative to said cup-holding device independently therefrom.

13. A machine for forming elongated metal containers from cup-shaped blanks comprising a barrel, in front of said barrel a die arranged coaxially therewith, a first sleeve-shaped bearing in said barrel, a sleeve-shaped cup-holding device slidably received within said bearing and having a front end adapted to slide into and hold a cup-shaped blank, second bearings in said cup-holding device near the front and the rear ends thereof, a punch slidably received within said second bearings for projection through said die, yieldable means for projecting said cup-holding device from said barrel section and for returning said punch from its projected position, means for limiting forward movement of said cup-holding device relative to said barrel including a collar at the rear end of said cup-holding device projecting radially beyond the outer surface of said cup-holding device to form a shoulder for engagement with the inner end edge of said first bearing, means for projecting said punch from said barrel and through said die in coaxial relation with said die including within said barrel a piston for actuation by hydraulic means, piston rod sections interposed between said piston and said punch, means for coupling said piston rod sections in a manner effective to transmit a forward thrust of said piston to said punch while permitting said piston rod sections to tilt and shift relative to each other, a plurality of circumferentially spaced studs of a smooth material mounted in the collar of said cup-holding device and arranged to project radially into sliding contact with the inner surface of said barrel, and in the space between the front end of said barrel and said die supports presenting rounded top surfaces for contact with the outer surface of said cup-holding device as said device is projected from said barrel, and means for coupling said cup-holding device to one of said piston rod sections in a manner compelling said cup-holding device to participate in the rearward movement of said piston rod sections with said punch from a predetermined position thereof relative to said piston rod sections while leaving said piston rod sections and said punch free to advance relative to said cup-holding device independently therefrom including a circumferential groove in one of said piston rod sections, a plurality of radially directed fingers, means for holding said fingers on to the collar of said cup-holding device for radial movement relative to said one piston rod section and yieldable means for urging said fingers radially against the outer surface of said one piston rod section so that they may engage said groove at a predetermined relative position of said one piston rod section and said cup-holding device.

References Cited by the Examiner

UNITED STATES PATENTS

| | | | |
|---|---|---|---|
| 601,738 | 4/1894 | Stampacchia | 113—120 |
| 759,726 | 5/1904 | Maxim | 287—129 |
| 998,968 | 7/1911 | Klocke et al. | 72—346 |
| 1,942,930 | 1/1934 | Ludington | 113—120 |
| 2,005,328 | 6/1935 | Smith | 72—349 |
| 2,017,054 | 10/1935 | Bruun | 72—348 |
| 2,337,182 | 12/1943 | Calleson et al. | 113—120 |
| 2,545,570 | 3/1951 | Caldwell | 72—350 |
| 2,768,540 | 10/1956 | Hanke | 72—354 |

CHARLES W. LANHAM, *Primary Examiner.*

RICHARD J. HERBST, *Examiner.*

UNITED STATES PATENT OFFICE
CERTIFICATE OF CORRECTION

Patent No. 3,312,097            April 4, 1967

Henry G. Henrickson et al.

It is hereby certified that error appears in the above numbered patent requiring correction and that the said Letters Patent should read as corrected below.

Column 2, line 3, for "in to" read -- into --; column 3, line 54, for "positions" read -- portions --; column 5, line 25, for "Teflon" read -- TEFLON --; line 31, for "surfaces" read -- surface --; line 62, strike out "the"; column 6, line 9, strike out "the", second occurrence; line 37, for "bears" read -- bear --; line 40, for "114" read -- 144 --; line 69, for "advanced" read -- advance --; column 7, line 17, for "predetermined" read -- predeterminable --.

Signed and sealed this 9th day of July 1968.

(SEAL)
Attest:

Edward M. Fletcher, Jr.            EDWARD J. BRENNER
Attesting Officer                  Commissioner of Patents